(12) United States Patent
Cai

(10) Patent No.: US 12,295,541 B2
(45) Date of Patent: May 13, 2025

(54) CHANGE-OVER VALVE AND VACUUM CLEANER

(71) Applicant: Liang Cai, Beijing (CN)

(72) Inventor: Liang Cai, Beijing (CN)

( * ) Notice: Subject to any disclaimer, the term of this patent is extended or adjusted under 35 U.S.C. 154(b) by 0 days.

(21) Appl. No.: 18/563,671

(22) PCT Filed: Feb. 16, 2022

(86) PCT No.: PCT/CN2022/076397
§ 371 (c)(1),
(2) Date: Nov. 22, 2023

(87) PCT Pub. No.: WO2022/247353
PCT Pub. Date: Dec. 1, 2022

(65) Prior Publication Data
US 2024/0260804 A1    Aug. 8, 2024

(30) Foreign Application Priority Data

May 24, 2021   (CN) .......................... 202121122551.7
Oct. 29, 2021  (CN) .......................... 202122636482.8
Oct. 29, 2021  (CN) .......................... 202122636503.6

(51) Int. Cl.
*A47L 9/20*    (2006.01)
*A47L 5/12*    (2006.01)
(Continued)

(52) U.S. Cl.
CPC .................. *A47L 9/20* (2013.01); *A47L 5/12* (2013.01); *A47L 9/125* (2013.01); *A47L 9/22* (2013.01);
(Continued)

(58) Field of Classification Search
CPC ... A47L 9/20; A47L 5/12; A47L 9/125; A47L 9/0072; F16K 11/0743
See application file for complete search history.

(56) References Cited

U.S. PATENT DOCUMENTS 3,318,075 A  *  5/1967  Wilson ...................... A47L 7/04
                                                      55/420
3,653,190 A  *  4/1972  Lee .......................... A47L 9/20
                                                      55/467
(Continued)

FOREIGN PATENT DOCUMENTS

CN    101164486 A     4/2008
CN    101313833 A    12/2008
(Continued)

OTHER PUBLICATIONS

PCT/CN2022/076397—International Search Report, mailed Apr. 28, 2022, 14 pages. (with English translation).

*Primary Examiner* — Craig M Schneider
*Assistant Examiner* — Christopher D Ballman
(74) *Attorney, Agent, or Firm* — Getech Law LLC; Jun Ye

(57) ABSTRACT

A changeover valve includes: a valve body and an internal-communication air duct and a driving device arranged in the valve body; wherein the valve body is connected with a housing of a vacuum cleaner, the housing is provided with a ventilation opening, an air inlet duct for driven inlet air and an air outlet duct for driven outlet air, the ventilation opening is provided with a filter element, a first end of the internal-communication air duct is connected with the ventilation opening, an outer side of the internal-communication air duct is connected with the driving device, so that the driving device drives a second end of the internal-communication air duct to rotate by a preset angle, the second end of the internal-communication air duct is connected at the air inlet duct and the air outlet duct communicates with the external space.

8 Claims, 2 Drawing Sheets

(51) Int. Cl.
*A47L 9/12* (2006.01)
*A47L 9/22* (2006.01)
B01D 46/00 (2022.01)
B01D 46/42 (2006.01)
B01D 46/69 (2022.01)
*A47L 9/00* (2006.01)
*F16K 11/074* (2006.01)

(52) U.S. Cl.
CPC ..... B01D 46/0042 (2013.01); B01D 46/4272 (2013.01); B01D 46/69 (2022.01); *A47L 9/0072* (2013.01); *B01D 2279/55* (2013.01); *F16K 11/0743* (2013.01)

(56) References Cited

U.S. PATENT DOCUMENTS

| | | | | |
|---|---|---|---|---|
| 3,842,461 A * | 10/1974 | Wurster | ............... | E03F 7/10 55/467 |
| 4,329,161 A * | 5/1982 | Osborn | ............... | B01D 46/71 15/352 |
| 4,574,420 A * | 3/1986 | Dupre | ............... | E01H 1/0836 15/352 |
| 4,820,315 A * | 4/1989 | DeMarco | ............... | B01D 50/20 95/271 |
| 4,921,510 A * | 5/1990 | Plooy | ............... | A47L 9/1418 15/352 |
| 5,096,472 A * | 3/1992 | Perry | ............... | A47L 9/20 55/482 |
| 5,125,125 A * | 6/1992 | Barsacq | ............... | A47L 5/38 15/314 |
| 5,231,805 A * | 8/1993 | Sander | ............... | B24C 1/086 451/92 |
| 5,254,147 A * | 10/1993 | Finke | ............... | A47L 9/1666 55/459.1 |
| 5,403,473 A * | 4/1995 | Moorehead | ............... | B01D 21/267 210/232 |
| 6,090,184 A * | 7/2000 | Cartellone | ............... | B01D 53/0407 15/353 |
| 6,458,178 B1 * | 10/2002 | Dietz | ............... | B01D 46/4272 55/284 |
| 6,471,751 B1 * | 10/2002 | Semanderes | ............... | B01D 46/76 95/271 |
| 6,569,217 B1 * | 5/2003 | DeMarco | ............... | B01D 50/20 96/380 |
| 6,712,868 B2 * | 3/2004 | Murphy | ............... | A47L 5/36 55/482 |
| RE40,048 E * | 2/2008 | Witter | ............... | B04C 5/04 55/346 |
| 7,343,643 B2 * | 3/2008 | Kondo | ............... | A47L 9/1683 15/352 |
| 7,780,752 B2 * | 8/2010 | Cha | ............... | A47L 9/122 55/299 |
| 7,909,910 B2 * | 3/2011 | Benner | ............... | B04C 11/00 55/423 |
| 8,029,584 B2 * | 10/2011 | Castronovo | ............... | B01D 46/42 55/284 |
| 8,516,654 B1 * | 8/2013 | McCutchen | ............... | A47L 9/20 15/352 |
| 10,470,632 B2 * | 11/2019 | Foenss | ............... | A47L 5/36 |
| 10,722,832 B1 * | 7/2020 | Spencer | ............... | B01D 45/16 |
| 10,849,478 B2 * | 12/2020 | Conrad | ............... | A47L 9/248 |
| 2004/0055470 A1 * | 3/2004 | Strauser | ............... | B01D 50/20 96/417 |
| 2007/0289444 A1 * | 12/2007 | Tsuchiya | ............... | A47L 9/2836 15/348 |
| 2008/0092326 A1 * | 4/2008 | Morishita | ............... | A47L 9/1683 15/352 |
| 2009/0019663 A1 * | 1/2009 | Rowntree | ............... | A47L 5/24 15/347 |
| 2009/0031525 A1 * | 2/2009 | Makarov | ............... | A47L 9/1641 15/347 |
| 2013/0263406 A1 * | 10/2013 | Amisani | ............... | A47L 9/10 15/347 |
| 2014/0237768 A1 | 8/2014 | Conrad | | |

FOREIGN PATENT DOCUMENTS

| | | |
|---|---|---|
| CN | 103384490 A | 11/2013 |
| CN | 105142481 A | 12/2015 |
| CN | 107837037 A | 3/2018 |
| CN | 110236444 A | 9/2019 |
| JP | 2007330457 A | 12/2007 |

* cited by examiner

CHANGE-OVER VALVE AND VACUUM CLEANER

CROSS REFERENCE OF RELATED APPLICATION

The present application is a 371 of international Application PCT/CN2022/076397, filed Feb. 16, 2022, which claims priority of Chinese Patent Application No. 2021226364828, filed to the China Patent Office on Oct. 29, 2021, entitled "Changeover Valve and Vacuum Cleaner", and the entire contents of which are incorporated herein by reference.

The present application also claims priority of Chinese Patent Application No. 2021226365036, filed to the China Patent Office on Oct. 29, 2021, entitled "Vacuum Cleaner", the entire contents of which are incorporated herein by reference.

The present application also claims priority of Chinese Patent Application No. 2021211225517, filed to the China Patent Office on May 24, 2021, entitled "Changeover Valve and Vacuum Cleaner", the entire contents of which are incorporated herein by reference.

TECHNICAL FIELD

The present application relates to the technical field of electric appliances, and in particular, to a changeover valve and a vacuum cleaner.

BACKGROUND

Because most vacuum cleaner filter elements in the market are often blocked by dust, which affects suction, timely cleaning is required. There are generally two ways to clean dust from vacuum cleaners: one is to clean with water, and the operation is cumbersome and the experience is poor; the other is to replace the filter element directly, but the replacement frequency is large and there is much waste.

In view of inconvenient dust cleaning in vacuum cleaner filter elements in related technologies, no effective solution has been put forward at present.

SUMMARY

The primary objective of the present application is to provide a changeover valve and a vacuum cleaner to solve the problem of inconvenient dust cleaning of a vacuum cleaner filter element in the related technology.

In order to achieve the above objective, in a first aspect, the present application provides a changeover valve.

The changeover valve according to the present application includes: a valve body and an internal-communication air duct and a driving device arranged in the valve body;

wherein the valve body is connected with a housing of a vacuum cleaner, the housing is provided with a ventilation opening, an air inlet duct for driven inlet air and an air outlet duct for driven outlet air, the ventilation opening is provided with a filter element, a first end of the internal-communication air duct is connected with the ventilation opening, an outer side of the internal-communication air duct is connected with the driving device, so that the driving device drives a second end of the internal-communication air duct to rotate by a preset angle, the second end of the internal-communication air duct is connected at the air inlet duct and the air outlet duct communicates with the external space, or the second end of the internal-communication air duct is connected at the air outlet duct and the air inlet duct communicates with the external space.

Optionally, the driving device includes a driving motor and a transmission gear, the driving motor is fixed inside the valve body, the transmission gear sleeves an output shaft of the driving motor, and the outer side of the internal-communication air duct is provided with rotating teeth meshing with the transmission gear.

Optionally, the valve body is further provided with an external-communication air duct for communicating with the external space, when the driving device drives the second end of the internal-communication air duct to rotate by a preset angle, the second end of the internal-communication air duct is connected at the air inlet duct and the external-communication air duct communicates with the air outlet duct, or the second end of the internal-communication air duct is connected at the air outlet duct and the external-communication air duct communicates with the air inlet duct.

Optionally, one end of the valve body away from the ventilation opening is provided with a first through hole and a second through hole, the first through hole communicates with the air outlet duct, and the second through hole communicates with the air inlet duct.

Optionally, a side wall of the valve body is provided with a plurality of protective holes communicating with the external space, and the external-communication air duct communicates with the protective holes.

Optionally, the space of the valve body outside the internal-communication air duct forms the external-communication air duct.

Optionally, one end of the valve body away from the ventilation opening is provided with a first through hole and a second through hole, the first through hole communicates with the air outlet duct, the second through hole communicates with the air inlet duct, the valve body is further provided with a chamber therein, the chamber communicates with the external space, and the air inlet duct or the air outlet duct communicates with the chamber through the first through hole and the second through hole, respectively.

Optionally, the changeover valve further includes a sealing ring, the sealing ring sleeving the second end of the internal-communication air duct.

In a second aspect, the present application also provides a vacuum cleaner including the changeover valve as described above.

Optionally, the vacuum cleaner further includes a suction motor mounted in the housing, wherein the air inlet duct communicates with an air inlet end of the motor, and the air outlet duct communicates with an air outlet end of the suction motor.

Optionally, the changeover valve is located in the housing, and the protective holes are arranged in the housing.

Optionally, the inside of the housing is provided with transverse corrugations for supporting the suction motor, so that the suction motor is located in the middle of the housing and a ventilation gap is formed between an outer wall of the suction motor and an inner wall of the housing, and the air inlet duct communicates with an air inlet end of the suction motor through the ventilation gap.

Optionally, the side wall of the valve body is of one-piece construction with the housing.

Optionally, the housing is provided with a motor chamber therein, the suction motor is fixed in the motor chamber, and a ventilation gap is provided between the suction motor and an inner wall of the motor chamber, the air inlet duct and the air outlet duct are located on the same side of the motor chamber, an air inlet end of the suction motor is close to the air inlet duct relative to the air outlet end, a first end of the air inlet duct communicates with an air inlet end of the suction motor, a first end of the air outlet duct communicates with an air outlet end of the suction motor through the ventilation gap, and a second end of the air inlet duct and a second end of the air outlet duct both extend out of the motor chamber.

Optionally, the air outlet duct is shaped to gradually increase in size toward the suction motor, such that an outer wall of the air outlet duct is encapsulated on the housing.

Optionally, the vacuum cleaner further includes a bottom cover and a sealing member, and one end of the housing close to the air outlet end of the suction motor is provided with an opening, and the bottom cover is encapsulated on the opening by the sealing member.

Optionally, the suction motor is fixed on the bottom cover.

Optionally, the inner wall of the motor chamber is provided with transverse corrugations for supporting the suction motor.

Optionally, a plurality of the transverse corrugations are arranged, and the plurality of transverse corrugations are arranged around the suction motor.

In an embodiment of the present application, a changeover valve is provided, which includes: a valve body and an internal-communication air duct and a driving device arranged in the valve body; wherein the valve body is connected with a housing of a vacuum cleaner, the housing is provided with a ventilation opening, an air inlet duct for driven inlet air and an air outlet duct for driven outlet air, the ventilation opening is provided with a filter element, a first end of the internal-communication air duct is connected with the ventilation opening, an outer side of the internal-communication air duct is connected with the driving device, so that the driving device drives a second end of the internal-communication air duct to rotate by a preset angle, the second end of the internal-communication air duct is connected at the air inlet duct and the air outlet duct communicates with the external space, or the second end of the internal-communication air duct is connected at the air outlet duct and the air inlet duct communicates with the external space. The valve body is driven by the driving device, so that the second end of the internal-communication air duct is connected with the air outlet duct or the air inlet duct, and the air flow direction in the internal-communication air duct is changed, i.e., the air flow flows to the internal-communication air duct through the filter element arranged at the ventilation opening to ensure that the air flow flowing into the air inlet duct is filtered, or the air flow flows to the filter element through the internal-communication air duct, the dust on the filter element is blown away, and the purpose of cleaning the dust on the filter element of the vacuum cleaner is realized. The dust cleaning process of the vacuum cleaner using the changeover valve is very convenient and can be realized only by driving the valve body, thereby solving the problem of inconvenient dust cleaning of the filter element of the vacuum cleaner in the related technology.

BRIEF DESCRIPTION OF FIGURES

To illustrate the technical solutions in the present application embodiments or the prior art more clearly, the accompanying drawings required to be used in the description of the embodiments or the prior art will be briefly described in the following, it is obvious that the accompanying drawings in the following description are some embodiments of the present application, and other drawings can be obtained according to these drawings for those of ordinary skill in the art without paying inventive step.

DETAILED DESCRIPTION

Figure 1:
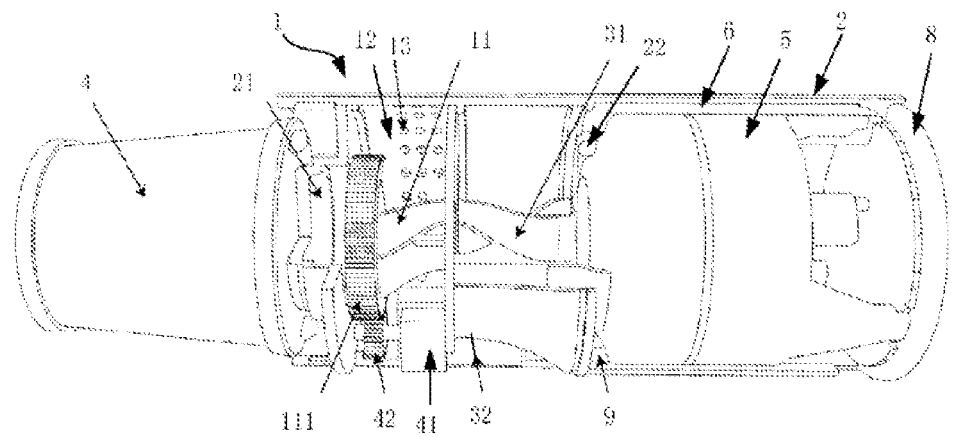
FIG. 1 is a partial cross-sectional diagram of a vacuum cleaner according to an embodiment of the present disclosure in a first state.

Implementation modes of the present application are described in further detail below with reference to the accompanying drawings and embodiments. The following embodiments serve to illustrate the present application, but are not intended to limit the scope of the present application.

It should be noted that the terms "first", "second" and the like in the description and claims of the present application and the figures described above are used for distinguishing similar objects and are not necessarily used to describe a particular order or sequence. It should be understood that the data used in this way can be interchanged where appropriate for the embodiments of the present application described herein. Further, the terms "including" and "having" and any variations thereof are intended to cover non-exclusive inclusion, for example, processes, methods, systems, products, or devices that include a series of steps or units need not be limited to those clearly listed, but may include other steps or units that are not clearly listed or are inherent to such processes, methods, products, or devices.

In this application, the terms "upper", "lower", "left", "right", "front", "rear", "top", "bottom", "inner", "outer", "center", "vertical", "horizontal", "lateral", "longitudinal" and the like indicate an orientation or positional relationship based on that shown in the drawings. These terms are primarily for the purpose of better describing the present application and the embodiments, and are not intended to limit that the indicated device, element or component must have a particular orientation or be constructed and operated in a particular orientation.

Moreover, some of the above terms may be used to denote other meanings than orientation or positional relationship, for example, the term "on" may also be used to denote a certain attachment or connection relationship in some cases. The specific meanings of these terms in the present application can be understood on a case-by-case basis to those of ordinary skill in the art.

Furthermore, the terms "mounted", "arranged", "provided with", "connected", "communicating", "fixed" are to be understood broadly. For example, a "connection" may be a fixed connection, a detachable connection, or a unitary construction; may be a mechanical connection, or an electrical connection; may be a direct connection, or an indirect connection through an intermediate medium, or an internal communication between two devices, elements or components. For those of ordinary skill in the art, the specific meanings of the above terms in the present application can be understood on a case-by-case basis.

In addition, the term "plurality" shall mean two as well as more than two.

It should be noted that the embodiments and the features of the embodiments in the present application can be combined with each other without conflict. The present application will be explained in detail below with reference to the accompanying drawings and in conjunction with the embodiments.

Figure 2:
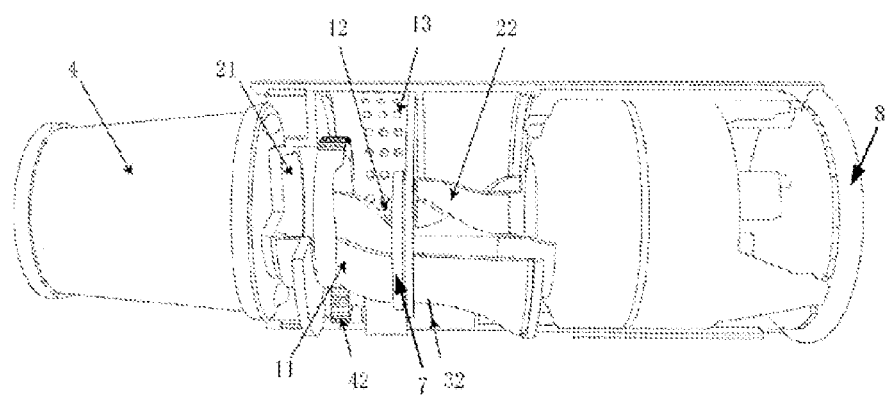
FIG. 2 is a partial cross-sectional diagram of the vacuum cleaner according to an embodiment of the present disclosure in a second state.
Figure 3:
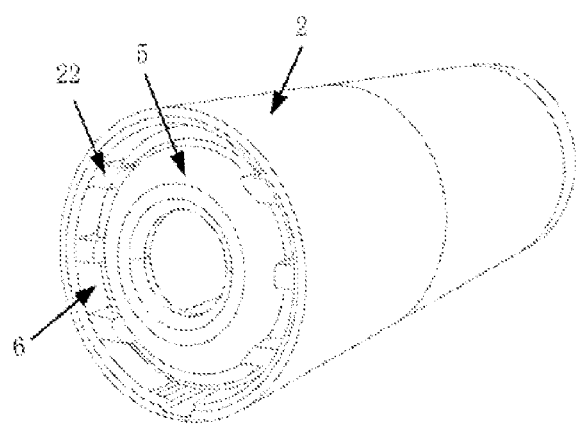
FIG. 3 is a partial structural diagram of the vacuum cleaner according to an embodiment of the present disclosure.

As shown in FIGS. 1 to 3, an embodiment of the present application provides a changeover valve, including: a valve body 1, and an internal-communication air duct 11 and a driving device arranged in the valve body 1;

wherein the valve body 1 is connected with a housing 2 of a vacuum cleaner, the housing 2 is provided with a ventilation opening 21, an air inlet duct 31 for driven inlet air and an air outlet duct 32 for driven outlet air, the ventilation opening 21 is provided with a filter element 4, a first end of the internal-communication air duct 11 is connected with the ventilation opening 21, an outer side of the internal-communication air duct 11 is connected with the driving device, so that the driving device drives a second end of the internal-communication air duct 11 to rotate by a preset angle, the second end of the internal-communication air duct 11 is connected at the air inlet duct 31 and the air outlet duct 32 communicates with the external space, or the second end of the internal-communication air duct 11 is connected at the air outlet duct 32 and the air inlet duct 31 communicates with the external space.

In particular, the valve body 1 is driven by the driving device, so that the second end of the internal-communication air duct 11 is connected with the air outlet duct 32 or the air inlet duct 31, and the air flow direction in the internal-communication air duct 11 is changed, i.e., the air flow flows to the internal-communication air duct 11 through the filter element 4 arranged at the ventilation opening 21 to ensure that the air flow flowing into the air inlet duct 31 is filtered, or the air flow flows to the filter element 4 through the internal-communication air duct 11, the dust on the filter element 4 is blown away, and the purpose of cleaning the dust on the filter element 4 of the vacuum cleaner is realized. The dust cleaning process of the vacuum cleaner using the changeover valve is very convenient and can be realized only by driving the valve body 1, thereby solving the problem of inconvenient dust cleaning of the filter element 4 of the vacuum cleaner in the related technology.

Wherein, as shown in FIGS. 1 and 2, the air flow direction of the vacuum cleaner to which the present changeover valve is applied is specifically:

when the second end of the internal-communication air duct 11 is connected at the air inlet duct 31 and the air outlet duct 32 communicates with the external space, the air flow enters the air inlet duct 31 for the driven inlet air by the driving device after entering the internal-communication air duct 11 via the filter element 4 and the ventilation opening 21, and then is driven to enter the air outlet duct 32 for the driven outlet air so as to flow to the external space via the air outlet duct 32; and when the second end of the internal-communication air duct 11 is connected to the air outlet duct 32 and the air inlet duct 31 communicates with the external space, the air flow enters the air outlet duct 32 through the air inlet duct 31 communicating with the external space, and then enters the internal-communication air duct 11, and then flows to the ventilation opening 21 and the filter element 4 through the internal-communication air duct 11.

Optionally, the driving device includes a driving motor 41 and a transmission gear 42, the driving motor 41 is fixed inside the valve body 1, the transmission gear 42 sleeves an output shaft of the driving motor 41, and the outer side of the internal-communication air duct 11 is provided with rotating teeth 111 meshing with the transmission gear 42.

In particular, the driving device includes the drive motor 41 and the transmission gear 42, while the outer side of the internal-communication air duct 11 is provided with the rotating teeth 111 meshing with the transmission gear 42, in this way, the transmission gear 42 is driven to rotate by the driving motor 41, that is, the rotating teeth 111 engaged with the transmission gear 42 are driven to rotate, further, the first end of the internal-communication air duct 11 is rotatably connected to the ventilation opening 21, while the second end of the internal-communication air duct 11 is connected to the air inlet duct 31 and the air outlet duct 32 communicates with the external space, or the second end of the internal-communication air duct 11 is connected to the air outlet duct 32 and the air inlet duct 31 communicates with the external space.

In particular, the valve body 1 is further provided with an external-communication air duct 12 for communicating with the external space, when the driving device drives the second end of the internal-communication air duct 11 to rotate by a preset angle, the second end of the internal-communication air duct 11 is connected at the air inlet duct 31 and the external-communication air duct 12 communicates with the air outlet duct 32, or the second end of the internal-communication air duct 11 is connected at the air outlet duct 32 and the external-communication air duct 12 communicates with the air inlet duct 31.

Wherein, one end of the valve body 1 away from the ventilation opening 21 is provided with a first through hole and a second through hole, the first through hole communicates with the air outlet duct 32, and the second through hole communicates with the air inlet duct 31.

Optionally, the valve body 1 is further provided with a chamber therein, the chamber is connected to an external space, the air inlet duct 31 or the air outlet duct 32 communicates with the chamber through the first through hole and the second through hole, respectively. Thus, the chamber may replace the external-communication air duct 12.

In particular, the valve body 1 is provided with the chamber, whereas the internal-communication air duct 11 is located in the chamber, when the internal-communication air duct 11 is connected to the air inlet duct 31, a port of the air outlet duct 32 is bare on the chamber, so that the air outlet duct 32 is connected to the chamber, and the air outlet duct 32 communicates with the external space. When the internal-communication air duct 11 is connected to the air outlet duct 32, a port of the air inlet duct 31 is bare on the chamber, so that the air inlet duct 31 is connected to the chamber, and the air inlet duct 31 communicates with the external space.

Optionally, the chamber in the valve body 1 located in the internal-communication air duct 11 forms the external-communication air duct 12.

Wherein, the space of the valve body 1 outside the internal-communication air duct 11 forms the external-communication air duct 12. The space between the internal-communication air duct 11 and the inner wall of the valve body 1 is the outer space, which is the chamber.

Wherein, by rotating only the second end of the internal-communication air duct 11, adjustment of the air flow direction in the internal-communication air duct 11 can be achieved.

Optionally, a side wall of the valve body 1 is provided with a plurality of protective holes 13 communicating with the external space, and the external-communication air duct 12 communicates with the protective holes 13.

Wherein, the protective holes 13 are located between the chamber and the external space such that external larger particles cannot enter the chamber through the protective holes 13, thereby preventing larger particles from entering the chamber and causing damage to the components.

Optionally, the changeover valve further includes a sealing ring 7, the sealing ring 7 sleeving the second end of the internal-communication air duct 11.

Wherein, the sealing ring 7 seals the connection of the second end of the internal-communication air duct 11 when the second end of the internal-communication air duct 11 communicates with the first through hole or the second through hole.

Based on the same technical idea, the present application also provides a vacuum cleaner, including the changeover valve described above.

In particular, the vacuum cleaner further includes a suction motor 5 mounted in the housing 2, wherein the air inlet duct 31 communicates with an air inlet end of the motor, and the air outlet duct 32 communicates with an air outlet end of the suction motor 5.

Optionally, the changeover valve is located in the housing 2, and the protective holes 13 are arranged in the housing 2.

Wherein, the side wall of the valve body 1 is of one-piece construction with the housing 2.

Optionally, the housing 2 is provided with a motor chamber 9 therein, the suction motor 5 is fixed in the motor chamber 9, and a ventilation gap 6 is provided between the suction motor 5 and an inner wall of the motor chamber 9, the air inlet duct 31 and the air outlet duct 32 are located on the same side of the motor chamber 9, an air inlet end of the suction motor 5 is close to the air inlet duct 31 relative to the air outlet end, a first end of the air inlet duct 31 communicates with an air inlet end of the suction motor 5, a first end of the air outlet duct 32 communicates with an air outlet end of the suction motor 5 through the ventilation gap 6, and a second end of the air inlet duct 31 and a second end of the air outlet duct 32 both extend out of the motor chamber 9.

In particular, by forming the ventilation gap between the outer wall of the suction motor 5 and the inner wall of the housing 2, and then, the air outlet duct 32 communicates with the air outlet end of the suction motor 5 through the ventilation gap, that is, the ventilation gap between the outer wall of the suction motor 5 and the inner wall of the housing 2 is used as a ventilation duct of the suction motor 5, the present vacuum cleaner does not need to be provided with an additional duct communicating with the air outlet end of the suction motor 5, thereby reducing the internal space of the housing 2, and further reducing the size or volume of the vacuum cleaner.

Optionally, the vacuum cleaner further includes a bottom cover 8 and a sealing member, and one end of the housing 2 close to the air outlet end of the suction motor 5 is provided with an opening, and the bottom cover 8 is encapsulated on the opening by the sealing member.

In particular, one side of the motor chamber 9 can be encapsulated by the bottom cover 8 and the sealing member.

Wherein, for the encapsulation of the other side of the motor chamber 9, optionally, the air outlet duct 32 is shaped to gradually increase in size in the direction of the suction motor 5, so that an outer wall of the air outlet duct 32 is encapsulated in the housing 2, and the encapsulation of the other side of the motor chamber 9 is completed.

In addition, for forming the ventilation gap between the suction motor 5 and the inner wall of the motor chamber 9, at least the following two ways can be employed:

First, optionally, the suction motor 5 is fixed on the bottom cover 8. That is, one side of the suction motor 5 is connected and fixed to the air inlet duct 31, and the other side of the suction motor 5 is fixed to the bottom cover 8, thereby completing the fixing of the suction motor 5.

Second, optionally, the inner wall of the motor chamber 9 is provided with transverse corrugations 22 for supporting the suction motor 5. That is, by providing the transverse corrugations 22 for supporting the suction motor 5, the ventilation gap 6 is formed between the outer wall of the suction motor 5 and the inner wall of the housing 2, and the air outlet duct 32 communicates with the air outlet end of the suction motor 5 through the ventilation gap 6.

Wherein, a plurality of the transverse corrugations 22 are provided, and the plurality of transverse corrugations 22 are arranged around the suction motor 5.

In an embodiment of the present application, a changeover valve is provided, which includes: a valve body 1 and an internal-communication air duct 11 and a driving device arranged in the valve body 1; wherein the valve body 1 is connected with a housing 2 of a vacuum cleaner, the housing 2 is provided with a ventilation opening 21, an air inlet duct 31 for driven inlet air and an air outlet duct 32 for driven outlet air, the ventilation opening 21 is provided with a filter element 4, a first end of the internal-communication air duct 11 is connected with the ventilation opening 21, an outer side of the internal-communication air duct 11 is connected with the driving device, so that the driving device drives a second end of the internal-communication air duct 11 to rotate by a preset angle, the second end of the internal-communication air duct 11 is connected at the air inlet duct 31 and the air outlet duct 32 communicates with the external space, or the second end of the internal-communication air duct 11 is connected at the air outlet duct 32 and the air inlet duct 31 communicates with the external space. The valve body 1 is driven by the driving device, so that the second end of the internal-communication air duct 11 is connected with the air outlet duct 32 or the air inlet duct 31, and the air flow direction in the internal-communication air duct 11 is changed, i.e., the air flow flows to the internal-communication air duct 11 through the filter element 4 arranged at the ventilation opening 21 to ensure that the air flow flowing into the air inlet duct 31 is filtered, or the air flow flows to the filter element 4 through the internal-communication air duct 11, the dust on the filter element 4 is blown away, and the purpose of cleaning the dust on the filter element 4 of the vacuum cleaner is realized. The dust cleaning process of the vacuum cleaner using the changeover valve is very convenient and can be realized only by driving the valve body 1, thereby solving the problem of inconvenient dust cleaning of the filter element 4 of the vacuum cleaner in the related technology.

Finally, it should be noted that the above embodiments are only used to illustrate the technical solution of the present application, not to limit it. Although the present application has been described in detail with reference to the foregoing embodiments, it should be understood by those of ordinary skill in the art that the technical solution described in the foregoing embodiments can still be modified or some technical features thereof can be equivalently substituted. These modifications or substitutions do not depart the essence of the corresponding technical solution from the spirit and scope of the technical solution of the embodiments of the present application.

What is claimed:

1. A changeover valve, comprising: a valve body (1) and an internal-communication air duct (11) and a driving device arranged in the valve body (1);
   wherein the valve body (1) is connected with a housing (2) of a vacuum cleaner, the housing (2) is provided with a ventilation opening (21), an air inlet duct (31) for driven inlet air and an air outlet duct (32) for driven outlet air, the ventilation opening (21) is provided with a filter element (4), a first end of the internal-communication air duct (11) is connected with the ventilation opening (21), an outer side of the internal-communication air duct (11) is connected with the driving device, so that the driving device drives a second end of the internal-communication air duct (11) to rotate by a preset angle, the second end of the internal-communication air duct (11) is connected at the air inlet duct (31) and the air outlet duct (32) communicates with an external space, or the second end of the internal-communication air duct (11) is connected at the air outlet duct (32) and the air inlet duct (31) communicates with the external space,
   wherein the valve body (1) is driven by the driving device, so that the second end of the internal-communication air duct (11) is connected with the air outlet duct (32) or the air inlet duct (31), and the air flow direction in the internal-communication air duct (11) is changed, such that the air flow flows to the internal-communication air duct (11) through the filter element (4) arranged at the ventilation opening (21) to ensure that the air flow flowing into the air inlet duct (31) is filtered, or the air flow flows to the filter element (4) through the internal-communication air duct (11), and dust on the filter element (4) is blown away,
   wherein when the second end of the internal-communication air duct (11) is connected at the air inlet duct (31) and the air outlet duct (32) communicates with the external space, the air flow enters the air inlet duct (31) for the driven inlet air by the driving device after entering the internal-communication air duct (11) via the filter element (4) and the ventilation opening (21), and then is driven to enter the air outlet duct (32) for the driven outlet air so as to flow to the external space via the air outlet duct (32); and
   wherein when the second end of the internal-communication air duct (11) is connected to the air outlet duct (32) and the air inlet duct (31) communicates with the external space, the air flow enters the air outlet duct (32) through the air inlet duct (31) communicating with the external space, and then enters the internal-communication air duct (11), and then flows to the ventilation opening (21) and the filter element (4) through the internal-communication air duct (11).

2. The changeover valve according to claim 1, wherein the driving device comprises a driving motor (41) and a transmission gear (42), the driving motor (41) is fixed inside the valve body (1), the transmission gear (42) sleeves an output shaft of the driving motor (41), and the outer side of the internal-communication air duct (11) is provided with rotating teeth (111) meshing with the transmission gear (42);
   wherein the transmission gear (42) is driven to rotate by the driving motor (41) such that the rotating teeth (111) engaged with the transmission gear (42) are driven to rotate, and
   wherein the first end of the internal-communication air duct (11) is rotatably connected to the ventilation opening (21), while the second end of the internal-communication air duct (11) is connected to the air inlet duct (31) and the air outlet duct (32) communicates with the external space, or the second end of the internal-communication air duct (11) is connected to the air outlet duct (32) and the air inlet duct (31) communicates with the external space.

3. The changeover valve according to claim 2, wherein the valve body (1) is further provided with an external-communication air duct (12) for communicating with the external space, when the driving device drives the second end of the internal-communication air duct (11) to rotate by a preset angle, the second end of the internal-communication air duct (11) is connected at the air inlet duct (31) and the external-communication air duct (12) communicates with the air outlet duct (32), or the second end of the internal-communication air duct (11) is connected at the air outlet duct (32) and the external-communication air duct (12) communicates with the air inlet duct (31).

4. The changeover valve according to claim 3, wherein one end of the valve body (1) away from the ventilation opening (21) is provided with a first through hole and a second through hole, the first through hole communicates with the air outlet duct (32), and the second through hole communicates with the air inlet duct (31).

5. The changeover valve according to claim 4, wherein a side wall of the valve body (1) is provided with a plurality of protective holes (13) communicating with the external space, and the external-communication air duct (12) communicates with the protective holes (13);
   wherein the protective holes (13) are located between a chamber and the external space such that external larger particles cannot enter the chamber through the protective holes (13), thereby preventing larger particles from entering the chamber and causing damage to the components.

6. The changeover valve according to claim 5, wherein the space of the valve body (1) outside the internal-communication air duct (11) forms the external-communication air duct (12), such that the space between the internal-communication air duct (11) and the inner wall of the valve body (1) is outer space, which is the chamber,
   wherein, by rotating only the second end of the internal-communication air duct (11), adjustment of the air flow direction in the internal-communication air duct (11) can be achieved.

7. The changeover valve according to claim 4, further comprising a sealing ring (7), the sealing ring (7) sleeving the second end of the internal-communication air duct (11);
   wherein, the sealing ring (7) seals the connection of the second end of the internal-communication air duct (11) when the second end of the internal-communication air duct (11) communicates with the first through hole or the second through hole.

8. The changeover valve according to claim 1, wherein one end of the valve body (1) away from the ventilation opening (21) is provided with a first through hole and a second through hole, the first through hole communicates with the air outlet duct (32), the second through hole communicates with the air inlet duct (31), the valve body (1) is further provided with a chamber therein, the chamber communicates with the external space, and the air inlet duct (31) or the air outlet duct (32) communicates with the chamber through the first through hole and the second through hole, respectively;
   wherein the valve body (1) is provided with a chamber, such that the internal-communication air duct (11) is located in the chamber, wherein when the internal-communication air duct (11) is connected to the air inlet duct (31), a port of the air outlet duct (32) is bare on the chamber, so that the air outlet duct (32) is connected to the chamber, and the air outlet duct (32) communicates with the external space, and wherein when the internal-communication air duct (11) is connected to the air outlet duct (32), a port of the air inlet duct (31) is bare on the chamber, so that the air inlet duct (31) is connected to the chamber, and the air inlet duct (31) communicates with the external space.

* * * * *